June 6, 1961
P. URBAN
2,987,379
PRODUCTION OF SULFUR
Filed Dec. 15, 1958
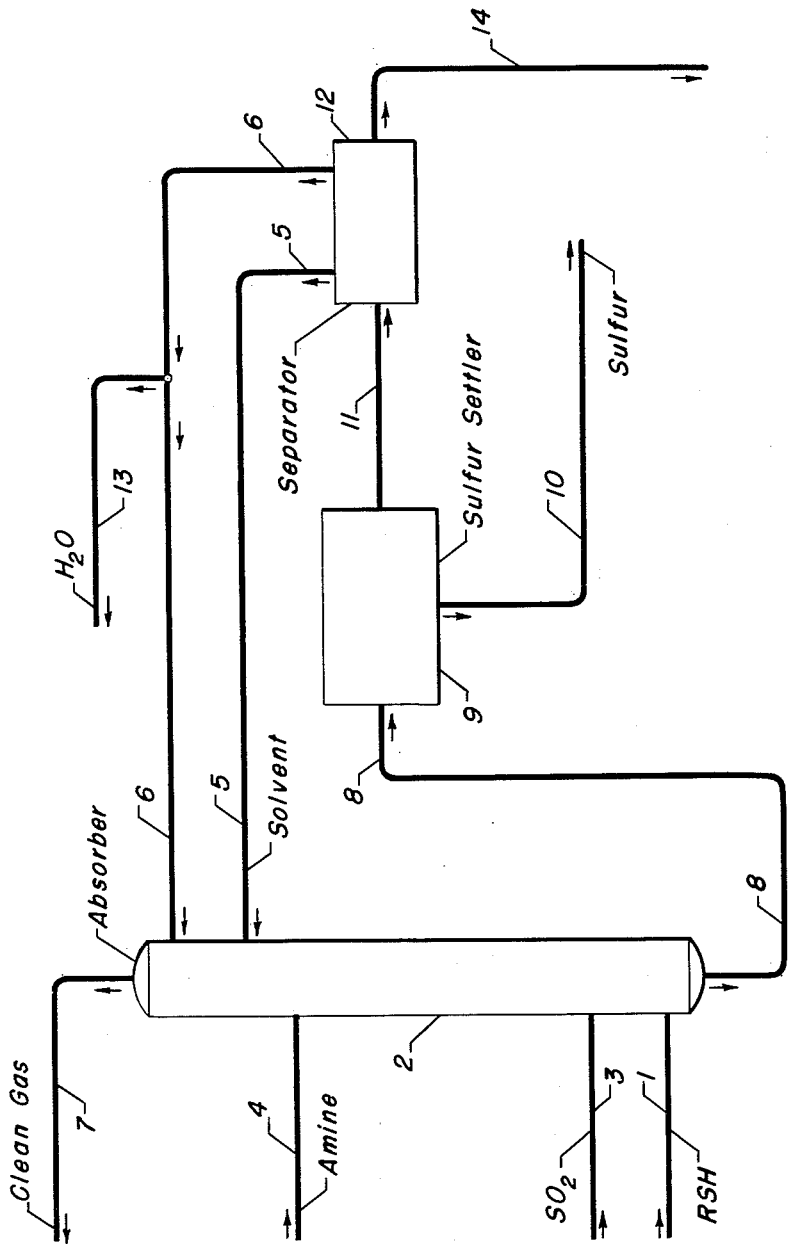
INVENTOR:
Peter Urban
BY: Chester J. Giuliani
Raymond H. Nelson
ATTORNEYS United States Patent Office 2,987,379
Patented June 6, 1961

2,987,379
PRODUCTION OF SULFUR
Peter Urban, Northbrook, Ill., assignor, by mesne assignments, to Universal Oil Products Company, Des Plaines, Ill., a corporation of Delaware
Filed Dec. 15, 1958, Ser. No. 780,581
10 Claims. (Cl. 23—225)

This invention relates to a process for the production of sulfur and particularly to a process for producing sulfur from hydrogen sulfide or an alkyl mercaptan. In addition the invention also relates to a process for purifying a gas stream by removing hydrogen sulfide from said stream.

In many industrial processes large amounts of sulfur are wasted by being vented to the atmosphere as hydrogen sulfide. Typical of these are processes for preparing various petroleum products, coking of coal, steel manufacture and others. In many cases, particularly in the refining of gasoline, the sulfur is a contaminant in the ultimate desired product and is converted to hydrogen sulfide during processing and disposed of in that form. Besides being wasteful, the venting of hydrogen sulfide to the atmosphere creates a nuisance, due to its unpleasant odor, which must be abated in many communities in order to conform to local regulations pertaining thereto.

Several solutions to this problem have been put into effect and these solutions are concerned in the most part with the abatement of the nuisance rather than the conservation of the sulfur thus produced. The processes are usually difficult to effect and, in the most part, are relatively costly, said processes usually consisting of converting the hydrogen sulfide to sulfur or sulfuric acid or to some form of sulfur which is salable to industry. One such solution has been to separate the hydrogen sulfide from the main stream by such means as an absorber employing an alkaline liquid such as an amine or metal hydroxide solution in countercurrent contact with the hydrogen sulfide-containing gas. The absorbing liquid is then stripped of hydrogen sulfide and the hydrogen sulfide is partially burned to form sulfur dioxide and water, the remainder of the hydrogen sulfide being reacted with sulfur dioxide to produce sulfur and water. The reaction is effected at higher temperatures and preferably at high pressures while utilizing a heterogeneous catalyst such as bauxite. This method has many unsatisfactory features including the expense and difficulty of concentrating hydrogen sulfide by means of an alkaline solution with substantial stripping, the use of heterogeneous catalysts which are not too well suited to chemical processes resulting in solid products, the difficulty of using corrosive materials such as water-sulfur dioxide mixtures at high temperatures and, in fact, the added difficulty of employing high temperatures with the attendant cost of providing heating means and maintaining these means at the required temperatures.

It is therefore an object of this invention to provide a process for recovering substantially pure sulfur from a gas stream containing hydrogen sulfide or alkyl mercaptans.

A further object of this invention is to provide a process for producing sulfur from a gas stream by providing a simple liquid phase low temperature non-catalytic process which will result in large conversions of hydrogen sulfide to substantially pure sulfur in an easily recoverable form.

One embodiment of this invention resides in a process for the production of sulfur which comprises absorbing sulfur dioxide and hydrogen sulfide in an organic solvent and water, reacting said sulfur dioxide and said hydrogen sulfide in contact with said water thereby forming sulfur, the improvement of said process which comprises adding a substituted amine to said solvent whereby said sulfur is formed in a more readily recoverable state, and separating the solvent and water.

A further embodiment of this invention is found in a process for the production of sulfur by absorbing sulfur dioxide and hydrogen sulfide in an organic solvent in which sulfur dioxide, hydrogen sulfide and water are soluble and having from about 0.01% to about 40% by volume of water dissolved therein, reacting said sulfur dioxide and said hydrogen sulfide in contact with said solvent thereby forming sulfur, in which the improvement to said process comprises adding a substituted amine to said solvent whereby said sulfur is formed in a more readily recoverable state, and separating the sulfur from said solvent.

A specific embodiment of the invention resides in a process for the production of sulfur which comprises absorbing sulfur dioxide and hydrogen sulfide in an organic solvent in which sulfur dioxide, hydrogen sulfide and water are soluble and having about 0.01% to about 40% by volume of water dissolved therein, reacting said sulfur dioxide and said hydrogen sulfide in contact with said solvent thereby forming sulfur, in which the improvement to said process comprises adding N,N-dimethylaniline to said solvent whereby said sulfur is formed in a granular state, and separating the sulfur from said solvent.

A more specific embodiment of the invetnion resides in a process for the production of sulfur which comprises absorbing sulfur dioxide and hydrogen sulfide in a kerosene in which sulfur dioxide, hydrogen sulfide and water are soluble and having from about 0.01% to about 50% by volume of water dissolved therein, reacting said sulfur dioxide and said hydrogen sulfide in contact with said solvent, thereby forming sulfur, in which the improvement to said process comprises adding N,N-diethylaniline to said solvent whereby said sulfur is formed in a granular state, and separating the sulfur from said solvent.

Other objects and embodiments referring to alternative sulfur containing compounds, alternative organic solvents and alternative substituted amines will be found in the following further detailed description of the invention.

As hereinbefore set forth the process of this invention provides an improvement for effecting the reaction between sulfur dioxide and a sulfur containing compound such as hydrogen sulfide to form sulfur and water while the two reactants are absorbed in a common liquid medium. By providing for such solution or absorption, the molecules are apparently brought into close proximity with others so that reactions can occur more readily between them. In the process of this invention, the reaction occurs without a catalyst substantially to completion even at ambient temperatures in contrast to prior art processes employing a vapor phase which requires high temperatures and a catalyst and which results in low conversions compared with the present process. Furthermore, the addition of a substituted amine of the type hereinafter set forth will allow the sulfur to be formed in a more readily recoverable state, such as in a granular form rather than in the colloidal form which is difficult to separate from the solvent and the water.

The solvent employed in this invention must have certain characteristics. Since a certain amount of water is required for the reaction to proceed rapidly, as will be hereinafter demonstrated, water must necessarily be soluble in the solvent to some significant extent. Another characteristic is that the solvent must be capable of absorbing or dissolving both hydrogen sulfide and sulfur dioxide. Another requirement of the solvent, although one that is easily met, is that it must not dissolve large quantities of sulfur inasmuch as a solvent having this characteristic would introduce another step in the process, namely recovering dissolved sulfur from the solvent.

Two distinct types of solvent may be used. The first is a solvent miscible in all proportions with water and when such a solvent is used, means must be provided to remove excess water from the solvent so that too much dilution doesn't occur. The other type of solvent is one which dissolves only limited quantities of water. A solvent with limited miscibility with water, to be used in this invention, must be capable of dissolving the necessary quantities of water to be hereinafter described and preferably is saturated within the desired water concentration range. When such a solvent is used, the excess water which results from the reaction may be removed simply by drawing off the aqueous phase.

Suitable solvents which may be used in the process of this invention may include, but are not limited to alcohols both mono- and polyhydroxy, having up to 5 carbon atoms, esters having up to 7 carbon atoms and ketones having up to 7 carbon atoms, relatively high boiling hydrocarbons, etc. Specific examples of the solvents include methanol, ethanol, propanol, butanol, etc., ethylene glycol, diethylene glycol, triethylene glycol, acetone, methylethyl ketone, methylbutyl ketone, methylpentyl ketone, dipropyl ketone, ethylacetate, butylacetate, etc., and higher boiling hydrocarbons such as kerosene, naphtha, etc., as well as mixtures of two or more of these solvents.

Examples of substituted amines which may be used include the di- and tri-substituted amines such as N,N-dimethylaniline, N,N-diethylaniline, N,N-dipropylaniline, dimethylamine, trimethylamine, diethylamine, triethylamine, dipropylamine, tripropylamine, dibutylamine, tributylamine, dipentylamine, tripentylamine, dimethanolamine, trimethanolamine, diethanolamine, triethanolamine, etc. It is to be understood that the aforementioned substituted amines are only representatives of the class of compounds which may be used and the present invention is not necessarily limited thereto. The amine will be present in the solution in an amount ranging from about 0.5 to about 10% or more by volume and preferably at a range of from about 1 to about 5% by volume.

The process of this invention may be best described with reference to the accompanying drawing which discloses a simplified flow diagram of the process, said drawing being intended to be illustrative of the invention rather than limiting on its broad scope.

In the drawing a gas stream containing a sulfur containing compound such as hydrogen sulfide is introduced through line 1 into the lower portion of absorber 2. This gas may be, for example, a normally gaseous material in the effluent from a petroleum desulfurization or reforming process, in which case it is desirable to recirculate the hydrogen in the gas and also to remove the hydrogen sulfide from such gas inasmuch as hydrogen sulfide has an adverse effect upon the catalyst employed in such process. In absorber 2 the rising hydrogen, for example, is mixed with $SO_2$ which is also introduced into the lower portion of absorber 2 through line 3. A substituted amine of the type hereinbefore set forth is also introduced into absorber 2 through line 4 where it commingles with a descending water-containing solvent stream. The rising mixture of $SO_2$ and hydrogen sulfide is contacted with the descending water-containing organic solvent-amine stream. It is contemplated within the scope of this invention that absorber 2 will contain internal means for effecting intimate contact between the rising gas stream and the descending liquid stream, such streams including, but not limited to perforated plates, bubble cap plates, turbo-grid trays, packing, screens or any other conventional device for causing such contact. The water-containing organic solvent is introduced into the upper portion of absorber 2 through line 5 and is obtained in a manner hereinafter set forth.

The water which is necessary for such an absorber may be introduced after having been commingled with the organic solvent stream or, as is shown in the preferred embodiment of the invention, in a separate stream disposed above the organic solvent stream such as through line 6. The purpose of this is to remove organic solvent from the hydrogen sulfide-free gas stream which is discharged from the top of absorber 2 through line 7 as clean gas. This not only is conservative of organic solvent, but provides adverse effects which such solvent might have as an impurity in the gas stream.

As the organic solvent and water along with the substituted amine descend through absorber 2 they absorb hydrogen sulfide and sulfur dioxide. The organic solvent and water are maintained at a temperaure of from about 0° C. to about 120° C. or more preferably at from about 20° C. to about 100° C. The only temperature limitation on this process is that the temperature must be such as to have a liquid phase solvent at absorber conditions. When maintained at these conditions, the absorbed hydrogen sulfide and sulfur dioxide react to form pure sulfur and water. The resultant stream discharging from the bottom of absorber 2 through line 8, therefore, contains organic solvent of the type hereinbefore described, substituted amines, water, sulfur, and sometimes unreacted hydrogen sulfide and sulfur dioxide. It should be mentioned here that the selection of a suitable solvent and suitable amine along with optimum operating conditions will cause substantially complete reaction of hydrogen sulfide with sulfur dioxide so that the residual unreacted components in the stream discharging from absorber 2 through line 8 will be negligible. As hereinbefore set forth the materials discharge through line 8 to sulfur settler 9 wherein the sulfur is removed from the stream. Inasmuch as the addition of the substituted amine will allow the recovery of sulfur in a more readily recoverable state such as a granular form rather than in colloidal form, the sulfur product may be removed by filtration, centrifically, by settling or by many other known means of removing solid particles from a liquid. If the temperature in the sulfur settler is maintained at a sufficient high temperature so that the sulfur is in a liquid or molten state the sulfur may be removed by simply drawing off from the total liquid as a separate immiscible phase. The thus separated sulfur will pass from sulfur settler 9 through line 10 to storage or a portion thereof may be burned to form sulfur dioxide which may be recycled through line 3 as a portion of the feed material.

The sulfur-free liquid passes through line 11 to a separator which may be a fractionator wherein the water formed by the reaction between hydrogen sulfide and sulfur dioxide is removed to prevent a build-up of water in the circulating solvent stream. Separator 12 may consist merely of a settling zone when the solvent employed dissolves only limited quantities of water. However, when the solvent is immiscible with water to a great extent, the separator zone 12 must separate water from the solvent by some other means such as fractionation, evaporation, hydration of salts, etc. It is contemplated within the scope of this invention that separator 12 may separate water only to the extent that it was added by the reaction, in which case, water will be withdrawn through line 6 and 13 and the desired water solvent mixture will pass to the top of absorber 2 through line 5. Separator 12 may, however, separate more water from the solvent than what was added by the reaction in which case a portion of the water is withdrawn through line 13, but some is added to the upper portion of absorber 2 through line 6 to scrub solvent from the exit gas as hereinbefore described. If so desired the separator may also separate the substituted amine from the solvent and water and pass this amine out through line 14 where it is recycled by means not shown in the drawing to line 4 where it will again pass into absorber 2.

The following examples are given to illustrate the process of the present invention, which, however, are not intended to limit the generally broad scope of the present invention in strict accordance therewith.

Example I

Hydrogen sulfide gas and sulfur dioxide gas were bubbled through butylacetate containing 12 volume percent of water and 1 volume percent of N,N-dimethylaniline, said mixture being maintained at a temperature of about 24° C. Sulfur precipitated out in a crystalline form which was readily recoverable from the liquid.

Example II

In this example sulfur dioxide gas and hydrogen sulfide gas were bubbled through a kerosene which was maintained at a temperature of about 25° C. and contained about 5% of water by volume and ½% N,N-diethylaniline by volume. Sulfur precipated out in a crystalline form and was readily recoverable from the liquid.

Example III

In this example ethylene glycol containing about 15% by volume of water and 1% by volume of dibutylamine was placed in an appropriate apparatus and hydrogen sulfide gas and sulfur dioxide gas was bubbled through the solution. The sulfur immediately precipitated out in crystalline form and was readily separated by allowing the sulfur to settle.

Example IV

In this example the above experiment was repeated, the difference being that the diethyleneglycol will contain 1% by volume of diethanolamine. Upon bubbling the sulfur dioxide and hydrogen sulfide gases through the solution the sulfur will immediately precipitate out in crystalline form and will thus be readily separable from the solvent.

Example V

In this example hydrogen sulfide and sulfur dioxide gases are bubbled through a solution of ethyleneglycol containing 15% by volume of water and ½% by volume of tributylamine. The sulfur will immediately precipitate out in crystalline form and is readily separated from the solvent by allowing said sulfur to settle.

The foregoing examples show that the present invention provides a method for readily removing sulfur in an easily recoverable form from a gas and provides a method for manufacturing sulfur from hydrogen sulfide in a simple non-catalytic low temperature one-step process. The examples thus set forth are not intended as an exhaustive treatment of all possible solutions or operating conditions. Besides varying operating conditions, solvents, and substituted amines, many other modifications of this process may be made within its broad scope. Therefore, various types of equipment may be used in which to effect the process and it may be effected on various process streams. For example, in a high pressure reforming process wherein gasoline is treated catalytically to improve its octane rating, the process may be performed on a gas stream which is maintained at a pressure in excess of 600 pounds per square inch in which case alterations of the process may be required to adapt it to such high pressures. Also, the process may be effected on gas streams which are sensitive to some of the solvents hereinbefore disclosed and in those cases the selection of the solvent may be dictated by the characteristics of the stream and the choices available would be more limited to those described in this specification. Furthermore, various arrangements of equipment employing instrumentation, pumps, compressors, valves, etc., according to good engineering practices may also be used within the broad scope of this invention. In other modifications the process may burn part of the sulfur recovered as a solution of sulfur dioxide or it may obtain sulfur dioxide from some other source.

I claim as my invention:

1. In a process for the production of sulfur which comprises absorbing sulfur dioxide and hydrogen sulfide in an organic solvent and water, reacting said sulfur dioxide and said hydrogen sulfide in contact with said solvent and said water thereby forming sulfur, the improvement which comprises adding to said solvent an amine selected from the group consisting of N,N-dimethylaniline, N,N-diethylaniline, N,N-dipropylaniline, dimethylamine, trimethylamine, diethylamine, triethylamine, dipropylamine, tripropylamine, dibutylamine, tributylamine, dipentylamine, tripentylamine, dimethanolamine, trimethanolamine, diethanolamine, and triethanolamine, whereby said sulfur is formed in a granular and more readily recoverable state, and separating said sulfur from the solvent and water.

2. In a process for the production of sulfur which comprises absorbing sulfur dioxide and hydrogen sulfide in an organic solvent in which sulfur dioxide, hydrogen sulfide and water are soluble and having from about 0.01% to about 40% by volume of water dissolved therein, reacting said sulfur dioxide and said hydrogen sulfide in contact with said solvent, thereby forming sulfur, the improvement which comprises adding to said solvent an amine selected from the group consisting of N,N-dimethylaniline, N,N-diethylaniline, N,N-dipropylaniline, dimethylamine, trimethylamine, diethylamine, triethylamine, dipropylamine, tripropylamine, dibutylamine, tributylamine, dipentylamine, tripentylamine, dimethanolamine, trimethanolamine, diethanolamine, and triethanolamine, whereby said sulfur is formed in a granular and more readily recoverable state, and separating the sulfur from said solvent and said water.

3. The process of claim 1 further characterized in that said amine comprises N,N-dimethylaniline.

4. The process of claim 1 further characterized in that said amine comprises tributylamine.

5. The process of claim 1 further characterized in that said amine comprises diethanolamine.

6. The process of claim 1 further characterized in that said amine comprises N,N-diethylaniline.

7. The process of claim 1 further characterized in that said amine comprises dibutylamine.

8. In a process for the production of sulfur which comprises absorbing sulfur dioxide and hydrogen sulfide in ethylene glycol in which sulfur dioxide, hydrogen sulfide and water are soluble and having from about 0.01% to about 40% by volume of water dissolved therein, reacting said sulfur dioxide and said hydrogen sulfide in contact with said solvent thereby forming sulfur, the improvement which comprises adding N,N-dimethylaniline to said solvent whereby said sulfur is formed in a granular state, and separating the sulfur from said solvent and water.

9. In a process for the production of sulfur which comprises absorbing sulfur dioxide and hydrogen sulfide in butylacetate in which sulfur dioxide, hydrogen sulfide and water are soluble and having from about 0.01% to about 40% by volume of water dissolved therein, reacting said sulfur dioxide and said hydrogen sulfide in contact with said solvent thereby forming sulfur, the improvement which comprises adding dibutylamine to said solvent whereby said sulfur is formed in a granular state, and separating the sulfur from said solvent and water.

10. In a process for the production of sulfur which comprises absorbing sulfur dioxide and hydrogen sulfide in a kerosene in which sulfur dioxide, hydrogen sulfide and water are soluble and having from about 0.01% to 5% by volume of water therein, reacting said sulfur dioxide and said hydrogen sulfide in contact with said solvent thereby forming sulfur, the improvement which comprises adding diethylaniline to said solvent whereby said sulfur is formed in a granular state, and separating the sulfur from said solvent and water.

References Cited in the file of this patent

UNITED STATES PATENTS

| | | |
|---|---|---|
| 2,080,408 | Ceccon | May 18, 1937 |
| 2,767,060 | Sloan | Oct. 16, 1956 |
| 2,881,047 | Townsend | Apr. 7, 1959 |